UNITED STATES PATENT OFFICE.

OLIVER H. PICHER, OF JOPLIN, MISSOURI.

PROCESS OF SMELTING AND SAVING FUMES FROM COMPLEX ORES.

SPECIFICATION forming part of Letters Patent No. 469,269, dated February 23, 1892.

Application filed September 25, 1891. Serial No. 406,843. (No specimens.)

*To all whom it may concern:*

Be it known that I, OLIVER H. PICHER, of Joplin, county of Jasper, State of Missouri, have invented a certain new and useful Improved Process of Smelting and Saving Fumes from Complex Ores, of which the following is a true and exact description.

Hitherto in treating compounds or mixtures of lead and zinc ores—such as galena and zinc-blende—it has been the practice first to smelt the compound or mixture with carbon in an open-hearth furnace, such as the Scotch hearth or modification thereof. The products of this stage of the treatment are metallic lead, metallic fumes, and slags. These slags contain the greater part of the zinc contents of the compounds or mixtures. The fumes are caught in the apparatus of the general character described in the patent to George T. Lewis, No. 212,855, of March 4, 1879. These slags and fumes were then charged together into a compound reducing and oxidizing furnace with proper fuel. The results of this stage of the treatment are a large proportion of metallic lead and fumes containing a mixture of lead oxides, lead sulphates, and zinc oxides, the fumes being caught in an apparatus of the character above described. This large proportion of metallic lead seems due to the fact that these slags contain a considerable quantity of lead sulphide, which in contact and reaction with the lead oxides and lead sulphates of the fumes which are charged with the slags readily produce metallic lead.

Another process in use consists in the treatment of compounds or mixtures of lead and zinc ores in a compound reducing and oxidizing furnaces, such as the Wetherill furnace or a modification thereof, in which both the lead and zinc contents of the ores are considerably reduced and oxidized, and the products of which treatment are, first, metallic fumes containing a mixture of zinc oxides, lead oxides, and lead sulphates, and, second, slags and other residues. These slags and residues are then treated without admixture with the fumes for the recovery and utilization of their metallic contents.

Both of the above treatments noted result in the production of fumes containing a mixture of zinc oxides, lead oxides, and lead sulphates, which is used as the basis of a pigment, but which is inferior in value to lead fumes pure or substantially pure.

Now, the object of my new treatment is to first produce a large proportion of lead fumes substantially free from zinc oxide; second, a pigment basis containing a high proportion of zinc oxide, and, third, though this is really incidental, a metallic lead product of smaller quantity, my process giving a larger pigment product than the first-mentioned treatment and one of greater value than either of the old treatments.

My new process consists in first treating the compounds or mixture of ores with carbon in a smelting-furnace, preferably a Scotch hearth or modification thereof, the heat of which is not sufficient to volatilize and oxidize the zinc contents of the ores, then catching and separately refining the resulting fumes in any convenient way, as by causing them to pass over a hot fire or through highly-heated retorts or flues, so as to burn out impurities and produce a substantially pure lead pigment, then separately treating the slags and other residues in admixture with carbon in a compound oxidizing and reducing furnace either of the slag hearth or Wetherill furnace type and separately catching and saving the mixture of lead and zinc fumes given off therefrom. It will be readily seen that by the treatment described I obtain a substantially pure lead-fume product of higher value than by either of the old treatments mentioned.

It will be understood that in saying that the temperature of the first smelting-furnace should be below that sufficient to volatize and oxidize the zinc contents of the ore I do not mean to limit myself to a temperature at which absolutely no zinc fumes are found, but to one by which the fumes of lead are not substantially contaminated with fumes of zinc.

The mixed fumes of lead and zinc may of course be purified in the same way as the lead fumes, and any of the well-known methods for burning out impurities and securing the metallic fumes in proper condition for use as a pigment may be employed.

Having now described my invention, what I claim as new, and desire to secure by Letters Patent, is—

In the smelting of compounds or mixtures of lead and zinc ores, the described process of first smelting the compound or mixture in admixture with carbon in a smelting-furnace the temperature of which is maintained at a point below that necessary to volatilize the zinc contents of the ore, but sufficient to partly smelt and partly volatilize and oxidize the lead contents, catching and refining the resulting fumes given off during this operation, then treating the slags and residues separately from the above fumes with carbon in a compound oxidizing and reducing furnace the temperature of which is sufficient to volatilize and oxidize the zinc contents thereof, and catching the resulting mixed fumes of zinc and lead.

OLIVER H. PICHER.

Witnesses:
LEWIS R. DICK,
JOSHUA MATLACK, Jr.